(12) United States Patent  
Dean

(10) Patent No.: US 9,617,944 B2  
(45) Date of Patent: Apr. 11, 2017

(54) OVER-FUELING CONTROL BASED ON OXYGEN SENSOR FEEDBACK

(71) Applicant: GM GLOBAL TECHNOLOGY OPERATIONS LLC, Detroit, MI (US)

(72) Inventor: Charles Dean, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 5 days.

(21) Appl. No.: 14/811,089

(22) Filed: Jul. 28, 2015

(65) Prior Publication Data

US 2017/0030285 A1  Feb. 2, 2017

(51) Int. Cl.
| | | |
|---|---|---|
| *F01N 3/36* | (2006.01) | |
| *F02D 41/30* | (2006.01) | |
| *F01N 3/20* | (2006.01) | |
| *F02D 41/14* | (2006.01) | |
| *F02D 41/22* | (2006.01) | |

(Continued)

(52) U.S. Cl.
CPC ........... *F02D 41/3005* (2013.01); *F01N 3/20* (2013.01); *F02D 41/1454* (2013.01); *F01N 3/2033* (2013.01); *F01N 3/36* (2013.01); *F01N 9/005* (2013.01); *F01N 2430/06* (2013.01); *F01N 2430/085* (2013.01); *F01N 2560/025* (2013.01); *F01N 2560/07* (2013.01); *F01N 2610/03* (2013.01); *F01N 2900/08* (2013.01); *F01N 2900/1402* (2013.01); *F02D 35/0092* (2013.01); *F02D 41/025* (2013.01); *F02D 41/1458* (2013.01); *F02D 41/182* (2013.01); *F02D 41/405* (2013.01); *F02D 2041/228* (2013.01); *F02D 2041/389* (2013.01); *F02D 2250/32* (2013.01); *Y02T 10/47* (2013.01)

(58) Field of Classification Search
CPC .......... F01N 3/2033; F01N 3/36; F01N 9/005; F01N 2430/06; F01N 2430/085; F01N 2560/025; F01N 2560/07; F01N 2610/03; F01N 2900/08; F01N 2900/1402; F02D 35/0092; F02D 41/025; F02D 41/1454; F02D 41/1458; F02D 41/182; F02D 2041/228; F02D 2041/389; F02D 41/405; F02D 2250/32; Y02T 10/47
USPC .................. 60/274, 276, 277, 285, 286, 303
See application file for complete search history.

(56) References Cited

U.S. PATENT DOCUMENTS

2003/0131587 A1* 7/2003 Kawamura ............. F01N 11/00
60/276

FOREIGN PATENT DOCUMENTS

GB    GB 2504715 A  *  2/2014 ........... F02D 41/029
JP    EP 0844380 A2 *  5/1998 ......... B01D 53/9495

* cited by examiner

*Primary Examiner* — Jorge Leon, Jr.
(74) *Attorney, Agent, or Firm* — Quinn IP Law

(57) ABSTRACT

A method of controlling a concentration of hydrocarbons in exhaust gas from an internal combustion engine includes sensing an oxygen percentage of the flow of exhaust gas from the internal combustion engine and determining a concentration of hydrocarbons in the flow of exhaust gas. An engine control module may then adjust the sensed oxygen percentage of the exhaust gas based on the determined concentration of hydrocarbons in the flow of exhaust gas to define a corrected oxygen percentage. The control module may then control at least one of a hydrocarbon injection rate for in-cylinder combustion of the internal combustion engine, and a hydrocarbon injection rate for a post combustion exhaust gas treatment process, based on the corrected oxygen percentage, to control the concentration of hydrocarbons in the exhaust gas.

18 Claims, 2 Drawing Sheets

(51) Int. Cl.
*F02D 41/02* (2006.01)
*F02D 41/18* (2006.01)
*F02D 41/38* (2006.01)
*F02D 41/40* (2006.01)
*F01N 9/00* (2006.01)
*F02D 35/00* (2006.01)

OVER-FUELING CONTROL BASED ON OXYGEN SENSOR FEEDBACK

TECHNICAL FIELD

The disclosure generally relates to a method of controlling an internal combustion engine, and more specifically, to a method of controlling a concentration of hydrocarbons in exhaust gas from the internal combustion engine.

BACKGROUND

Internal combustion engines inject hydrocarbons, i.e., fuel, into cylinders of the engine for combustion to generate power. However, not all of the hydrocarbons that are injected into the cylinders is combusted during the combustion cycle, and are expelled from the engine with the other exhaust gases. Additionally, some vehicles will inject hydrocarbons into the cylinders of the vehicle after combustion occurs, and/or into the flow of exhaust gas in an exhaust gas treatment system, to increase the concentration of hydrocarbons in the flow of exhaust gas. The hydrocarbons are injected into the exhaust gas in order to provide an exothermic reaction, which heats various devices of the exhaust gas treatment system for various purposes.

In order to produce the exothermic reaction, the hydrocarbons in the flow of exhaust gas require oxygen in the exhaust gas to react with. The amount of oxygen in the exhaust gas must be sufficient to react with the quantity of hydrocarbons in the exhaust gas, or some of the hydrocarbons will not combust, and may react with catalysts in the different devices of the exhaust gas treatment system, generating excessive heat within the devices. A vehicle controller may estimate the amount of oxygen in the flow of exhaust gas from the mass airflow and the estimated fuel injected into the engine. The vehicle controller may then control the amount of hydrocarbons injected into the flow of exhaust gas, based on the estimated amount of oxygen. However, if the measured mass airflow or the estimated fuel injected into the engine are incorrect, the vehicle controller may inject an excess quantity of hydrocarbons into the flow of exhaust gas, with insufficient oxygen to react with the quantity of hydrocarbons injected into the exhaust gas.

SUMMARY

A method of controlling an internal combustion engine of a vehicle is provided. The method includes sensing an oxygen percentage of a flow of exhaust gas from the internal combustion engine with an oxygen sensor, and adjusting the sensed oxygen percentage of the exhaust gas based on a concentration of hydrocarbons in the flow of exhaust gas, with an engine control module. The sensed oxygen percentage is adjusted to define a corrected oxygen percentage. The engine control module may then control hydrocarbon injection into the internal combustion engine, based on the corrected oxygen percentage.

A method of controlling a concentration of hydrocarbons in exhaust gas from an internal combustion engine of a vehicle is also provided. The method includes sensing an oxygen percentage of the flow of exhaust gas from the internal combustion engine, with an oxygen sensor. The oxygen sensor is disposed downstream of an exhaust outlet of the internal combustion engine, and upstream of any catalytic devices of an exhaust gas treatment system. A concentration of hydrocarbons in the flow of exhaust gas is determined with an engine control module. The engine control module may then adjust the sensed oxygen percentage of the exhaust gas based on the determined concentration of hydrocarbons in the flow of exhaust gas. The sensed oxygen percentage is adjusted to define a corrected oxygen percentage. The control module may then control at least one of a hydrocarbon injection rate for in-cylinder combustion of the internal combustion engine, and a hydrocarbon injection rate for a post combustion exhaust gas treatment process, based on the corrected oxygen percentage.

Accordingly, the quantity of hydrocarbons injected into the exhaust gas is controlled based on the corrected oxygen percentage in the flow of exhaust gas, which is derived from the measurement of oxygen in the exhaust gas, and is not estimated from a model based on the mass inflow rate and the fuel usage of the engine. Because the sensed oxygen level may be skewed downward by the existence of hydrocarbons in the exhaust gas, the sensed value of the oxygen in the exhaust gas must be corrected based on the concentration of the hydrocarbons in the exhaust gas. However, once the sensed oxygen percentage is corrected to account for the concentration of hydrocarbons in the exhaust gas, the corrected oxygen percentage may be used by the engine control module to determine an allowable quantity of hydrocarbons that may be injected into the exhaust gas for the amount of oxygen present in the exhaust gas. Accordingly, by using the corrected oxygen percentage to control hydrocarbon injection into the exhaust gas, which is derived from the oxygen directly sensed in the exhaust gas, the amount or quantity of hydrocarbons injected into the exhaust gas is directly linked to the actual amount of oxygen in the exhaust gas available for combustion with the hydrocarbons.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
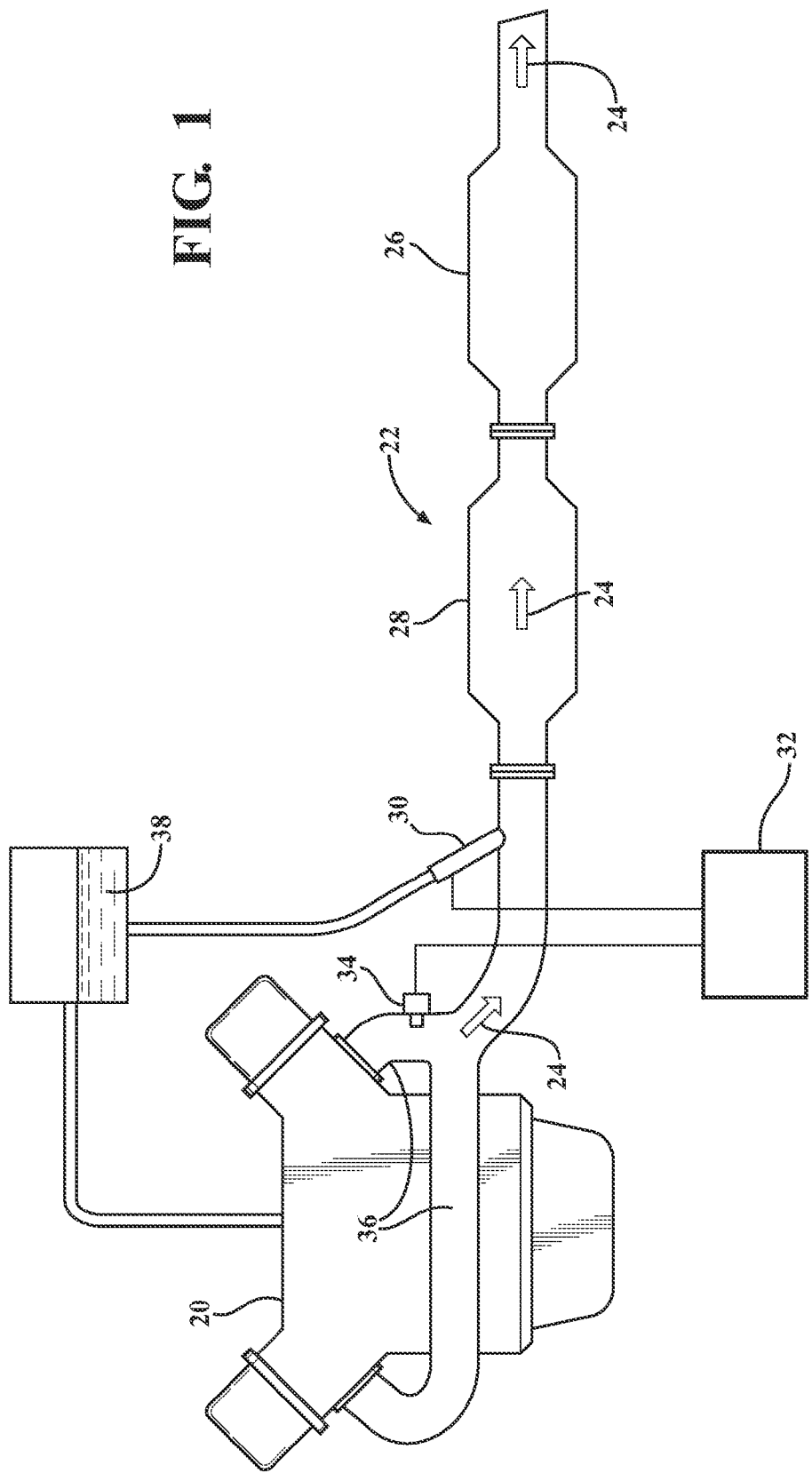
FIG. 1 is a schematic diagram of an internal combustion engine and an associated exhaust gas treatment system.

Referring to the Figures, wherein like numerals indicate like parts throughout the several views, an internal combustion engine is generally shown at 20 in FIG. 1. The teachings of this disclosure are most applicable to a diesel engine. However, it should be appreciated that the teachings of this disclosure may be applied to other types of engines, such as a gasoline or a natural gas engine. Accordingly, the scope of the claims should not be limited to applications in which the engine 20 is a diesel engine, but may include other types and/or configurations of engines.

Referring to FIG. 1, fuel for combustion is injected into cylinders of the internal combustion engine 20 for combustion used to generate power. Combustion of the fuel produces a flow of exhaust gas that is directed through an exhaust gas treatment system 22 in a direction indicated by arrow 24. The exhaust gas treatment system 22 treats the exhaust gas to reduce undesirable emissions, and remove particulate matter, i.e., soot, from the exhaust gas. The exhaust gas treatment system 22 may be configured in any suitable manner capable of treating the exhaust gas from the engine 20. For example, and as shown in FIG. 1, if the engine 20 is configured as a diesel engine 20, then the exhaust gas treatment system 22 may include a diesel particulate filter 26, and at least one catalytic device 28.

The diesel particulate filter 26 traps and/or collects soot and other particles from the exhaust gas as is known in the art. The specific construction and/or operation of the diesel particulate filter 26 are known to those skilled in the art, are not pertinent to the teachings of this disclosure, and are therefore not described in detail herein.

The catalytic device 28 includes at least one chemical catalyst that reacts with components of the exhaust gas. The chemical catalyst may include a precious metal, including but not limited to, platinum or palladium. The chemical catalyst, when heated to a light-off temperature, interacts with and oxidizes components in the exhaust gas, such as carbon monoxide and unburned hydrocarbons, thereby reducing undesirable emissions from the internal combustion engine 20. The specific construction and/or operation of the available catalytic devices 28 suitable for use in the exhaust gas treatment system 22 are known to those skilled in the art, are not pertinent to the teachings of this disclosure, and are therefore not described in detail herein.

Different processes of the exhaust gas treatment system 22 require the injection of hydrocarbons, e.g., fuel, into the flow of exhaust gas from the internal combustion engine 20. The injected hydrocarbons combust in the flow of exhaust gas, thereby generating heat, which is required by the different components of the exhaust gas treatment system 22 to execute the different processes of the exhaust gas treatment system 22. For example, the diesel particulate filter 26 requires heat for a regeneration process. The regeneration process of the diesel particulate filter 26 includes heating the diesel particulate filter 26 to a burn temperature sufficient to burn the soot and particulate matter accumulated in the diesel particulate filter 26 to ash, as is known in the art. Additionally, the chemical catalysts of the catalytic device (s) 28 of the exhaust gas treatment system 22 must be heated to a light-of-temperature in order to react with the reactants in the exhaust gas. Hydrocarbons are injected into the flow of exhaust gas to quickly bring the temperature of the chemical catalysts to the light-of-temperature as is known in the art. It should be appreciated that the exhaust gas treatment system 22 may perform other processes that require the injection of hydrocarbons into the flow of exhaust gas for the purpose of heating a specific component of the exhaust gas treatment system 22, or for some other purpose.

In addition to the hydrocarbons injected into the flow of exhaust gas, it should be appreciated that hydrocarbons from unburnt combustion fuel may exist within the flow of exhaust gas. The hydrocarbons may be injected into the flow of exhaust gas in any suitable manner. The hydrocarbons, in the form of fuel for example, may be injected into the cylinders of the internal combustion engine 20 in a post combustion fuel injection process as is known in the art. Alternatively, and as shown in FIG. 1, the exhaust gas treatment system 22 includes an injector 30 that injects the hydrocarbons 38, in the form of fuel, into the flow of exhaust gas. Whether injected into the cylinders of the engine 20 after the combustion cycle of the engine 20, or injected directly into the flow of exhaust by the injector 30, the hydrocarbons 38 are introduced into the flow of exhaust gas upstream of any of the exhaust gas treatment processes and/or devices in the exhaust gas treatment system 22.

The vehicle may include a control module, such as but not limited to an engine control module 32, to control the operation of the internal combustion engine 20 and/or the exhaust gas treatment system 22. The engine control module 32 may be referred to by other terms, such as but not limited to a controller, a vehicle controller, a computer, a module, or some other similar term. The engine control module 32 may include a computer and/or processor, and include all software, hardware, memory, algorithms, connections, sensors, etc., necessary to manage and control the operation of the internal combustion engine 20 and/or the exhaust gas treatment system 22. As such, a method of controlling the internal combustion engine 20 and the exhaust gas treatment system 22 may be embodied as a program operable on the engine control module 32. It should be appreciated that the engine control module 32 may include any device capable of analyzing data from various sensors, comparing data, making the necessary decisions required to control the operation of the internal combustion engine 20 and/or the exhaust gas treatment system 22, and executing the required tasks necessary to control the operation of the internal combustion engine 20 and/or the exhaust gas treatment system 22.

The engine control module 32 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The engine control module 32 includes tangible, non-transitory memory on which are recorded computer-executable instructions, including a hydrocarbon injection control algorithm. The processor of the engine control module 32 is configured for executing the hydrocarbon injection control algorithm. The hydrocarbon injection control algorithm implements a method of controlling a quantity of excess hydrocarbons injected into the flow of exhaust gas based on a sensed oxygen level in the flow of exhaust gas.

Figure 2:
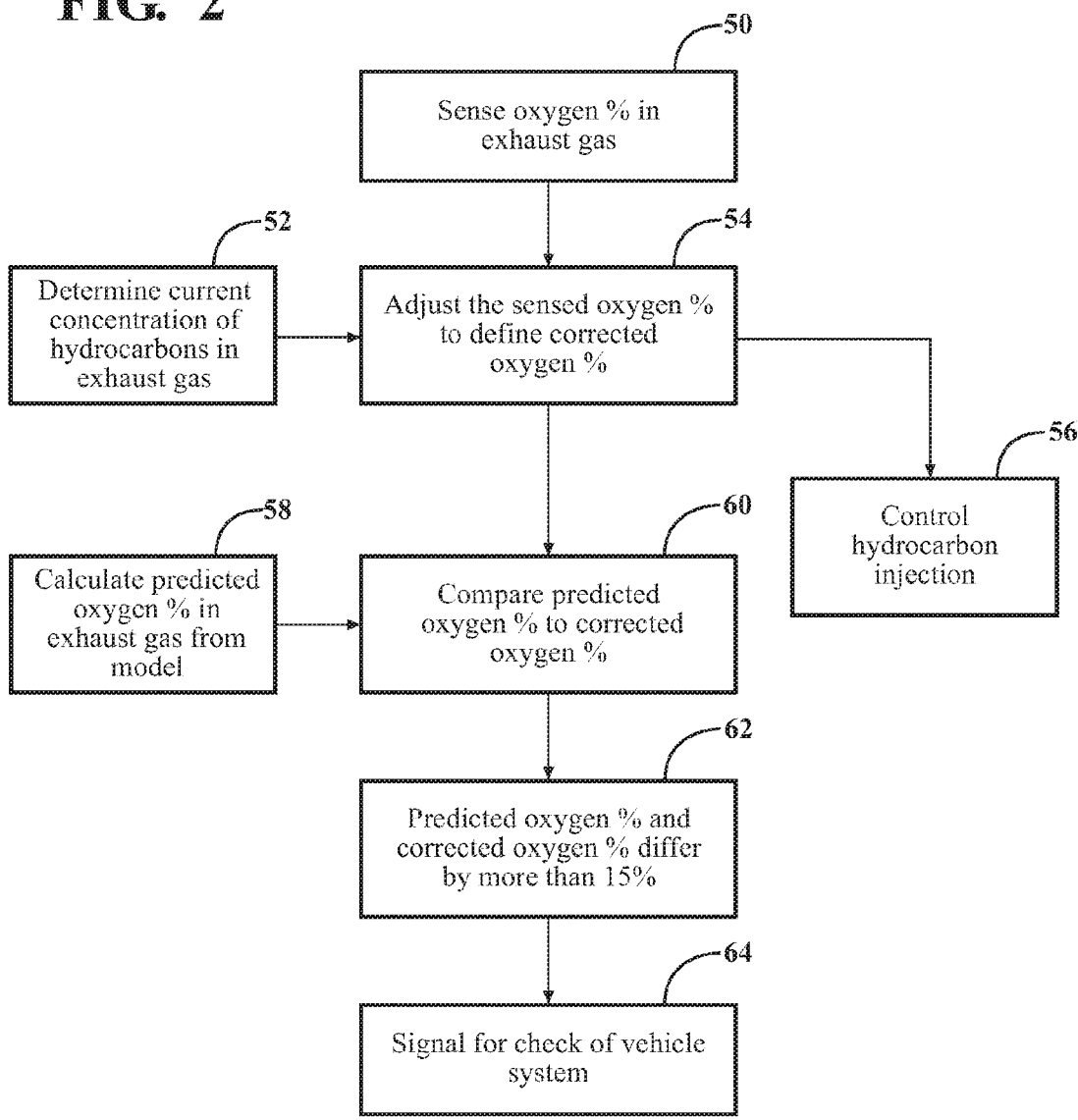
FIG. 2 is a flowchart representing a method of controlling the hydrocarbon injection into a flow of exhaust gas.

The method of controlling the internal combustion engine 20, and more specifically the method of controlling a concentration of hydrocarbons in the flow of exhaust gas from the internal combustion engine 20, is described below. Referring to FIG. 2, the method includes sensing an oxygen percentage of the flow of exhaust gas from the internal combustion engine 20, generally indicated by box 50. The oxygen percentage is the amount or quantity of oxygen per unit volume or mass of exhaust gas. While described herein in the form of a percentage, it should be appreciated that the oxygen percentage may be described in some other quantitative measurement, such as but not limited to, a mass of oxygen per unit volume, etc. The oxygen percentage is sensed with an oxygen sensor 34, shown in FIG. 1. The oxygen sensor 34 is disposed downstream of an exhaust outlet 36 of the internal combustion engine 20, and upstream of the catalytic device(s) 28 of the exhaust gas treatment system 22. The oxygen sensor 34 may include any type and/or style of sensor capable of sensing the quantity of oxygen in the flow of exhaust gas. The oxygen sensor 34 communicates the sensed oxygen percentage of the engine control module 32.

The sensed oxygen percentage in the flow of exhaust gas is affected by the concentration of hydrocarbons in the flow of exhaust gas. The level of oxygen in the flow of exhaust gas that is sensed by the oxygen sensor 34 is reduced as the concentration of hydrocarbons increases. In other words, higher levels of hydrocarbon concentration skews the measurement of the oxygen sensor 34 downward, so that the oxygen sensor 34 provides a lower reading than that actual oxygen level. Accordingly, high levels of hydrocarbon concentration in the flow of exhaust gas, such as may occur during regeneration of the diesel particulate filter 26, or while heating the catalytic device(s) 28 of the exhaust gas treatment system 22, cause the oxygen sensor 34 to provide an oxygen level reading that is below the actual oxygen level in the flow of exhaust gas. Accordingly, the sensed oxygen percentage must be corrected to account for the variance between the actual oxygen level in the exhaust gas and the sensed oxygen level represented by the sensed oxygen percentage.

In order to correct for the variance between the actual oxygen level in the exhaust gas and the sensed oxygen percentage, the current concentration of hydrocarbons in the flow of exhaust gas must be determined, generally indicated by box 52. The concentration of hydrocarbons in the flow of exhaust gas may be determined in any suitable manner. For example, the current concentration of hydrocarbons in the flow of exhaust gas may be determined by calculation based upon an estimated quantity of hydrocarbons injected into the internal combustion engine 20 over a period of time. For example, through trial and measurement, a model may be developed that predicts or estimates the amount of hydrocarbons that exist in exhaust gas after combustion for a specific engine 20. The model may be based on the quantity of fuel injected into the engine 20 for combustion. The engine control module 32 may calculate the concentration of hydrocarbons in the exhaust gas from the model, based on the quantity of fuel injected into the engine 20. The engine control module 32 may further consider any fuel or hydrocarbons that were injected into the engine 20 for exhaust gas treatment purposes. The calculation of the concentration of hydrocarbons may be based on a pre-defined time period preceding the calculation, so as to accurately model the current concentration of hydrocarbons in the flow of exhaust, at the time at which the oxygen percentage was sensed.

Once the oxygen percentage has been sensed, and the current concentration of hydrocarbons in the flow of exhaust has been determined, the sensed oxygen percentage of the exhaust gas is adjusted or corrected, generally indicated by box 54, based on the determined concentration of hydrocarbons in the flow of exhaust gas, to define a corrected oxygen percentage. The sensed oxygen percentage may be adjusted to correct it for any inaccuracy caused by the concentration of hydrocarbons in the exhaust gas in any suitable manner. For example, through trial and measurement, a model may be created that predicts the sensed oxygen percentage from the oxygen sensor 34, at a specific, actual oxygen level of the exhaust gas, at a specific hydrocarbon concentration. Once such a model is created, the engine control module 32 may use the model to adjust the sensed oxygen percentage to define the corrected oxygen percentage. It should be appreciated, that the corrected oxygen percentage is still based on and/or derived from the sensed oxygen level from the oxygen sensor 34, and is not merely predicted or estimated from a model. Rather, the model may provide an oxygen correction factor that modifies the sensed oxygen percentage to correct for the variance between the sensed oxygen percentage and the actual level of oxygen in the exhaust gas. The engine control module 32 may then apply the oxygen correction factor to the sensed oxygen percentage to obtain the corrected oxygen percentage. The correction factor may include a linear relationship between the sensed oxygen percentage and the actual level of oxygen in the exhaust gas. However, more likely, the correction factor may include an exponential relationship between the sensed oxygen percentage and the actual level of oxygen in the exhaust gas, such that the correction factor is greater with a higher hydrocarbon concentration.

Once the corrected oxygen percentage is calculated or derived from the sensed oxygen percentage, the engine control module 32 may then use the corrected oxygen percentage to control hydrocarbon injection, generally indicated by box 56, into the internal combustion engine 20 and/or flow of exhaust gas. The engine control module 32 may control at least one of a hydrocarbon injection rate for in-cylinder combustion of the internal combustion engine 20, and/or a hydrocarbon injection rate for a post combustion exhaust gas treatment process, in order to prevent or limit excess hydrocarbons in the flow of exhaust gas.

Controlling hydrocarbon injection into the internal combustion engine 20 based on the corrected oxygen percentage may include limiting hydrocarbon injection into the internal combustion engine 20 to a hydrocarbon concentration that is capable of being combusted with a quantity of oxygen in the flow of exhaust gas indicated by the corrected oxygen percentage. As such, the corrected oxygen percentage represents a measure of how much oxygen is currently in the flow of exhaust gas. That quantity of oxygen is only capable of combusting a determinable quantity of hydrocarbons. If excess hydrocarbons are introduced into the flow of exhaust gas than may be combusted with the available quantity of oxygen in the exhaust gas, the excess hydrocarbons will remain in the exhaust gas and react with the chemical catalyst in the catalytic device(s) 28 causing excessive exothermic reactions. Accordingly, the engine control module 32 limits the quantity of hydrocarbons that are injected into the flow of exhaust gas to a quantity that may be combusted with the available oxygen in the exhaust gas. The engine control module 32 determines the amount of hydrocarbons that may be injected into the exhaust gas, based on the corrected oxygen percentage, which is an indication of the amount of oxygen currently present in the flow of exhaust gas.

Additionally, the engine control module 32 may control or prevent hydrocarbon injection into the internal combustion engine 20 when the corrected oxygen percentage is less than a pre-defined minimum value. The pre-defined minimum value for the corrected oxygen percentage may be defined to equal any desirable value. For example, the pre-defined minimum value of the corrected oxygen percentage may be defined to equal 1.0%. If the corrected oxygen percentage falls to below this value, then engine control module 32 may prevent post combustion hydrocarbon injection and/or stop exhaust gas treatment processes, such as regeneration of the diesel particular filter, in order to prevent unintended and/or excessive exothermic reactions in the various components of the exhaust gas treatment system 22, as well as avoid visible white smoke and unpleasant odors from raw hydrocarbons in the exhaust gas.

It is known to estimate the oxygen percentage in the flow of exhaust gas from a model based on a sensed mass airflow value of the internal combustion engine 20, and a value or quantity of hydrocarbons injected into the internal combustion engine 20. The level or amount of oxygen calculated to exist in the flow of exhaust gas from such a model is referred to herein as the predicted oxygen percentage. The engine control module 32 senses the mass of air provided to the internal combustion engine 20 for combustion, and either measures or estimates the quantity of fuel injected into the internal combustion engine 20, and uses these values as inputs into the model, to calculate the predicted oxygen percentage in the flow of exhaust gas from the existing model, generally indicated by box 58. It is important to note that the process of estimating the oxygen percentage from a model based on the mass airflow and injected fuel quantity does not use or actually sense the oxygen level in the exhaust gas. Accordingly, errors in either the sensed mass airflow or in the quantity of fuel injected into the engine 20 may skew the predicted oxygen percentage, and cause the engine control module 32 to improperly control the quantity of hydrocarbons injected into the flow of exhaust gas. However, the engine control module 32 may use such a predicted oxygen percentage to corroborate the corrected oxygen percentage that is derived from the sensed oxygen percentage as is described above.

Additionally, the engine control module 32 may compare the predicted oxygen percentage and the corrected oxygen percentage, generally indicated by box 60, as a self-diagnostic protocol, and/or may use either the predicted oxygen percentage or the corrected oxygen percentage to control one or more engine 20 operations, not specifically related to control of excess hydrocarbons in the flow of exhaust gas. By comparing the corrected oxygen percentage to the predicted oxygen percentage, the engine control module 32 may identify if the corrected oxygen percentage and the predicted oxygen percentage differ by some pre-defined amount, thereby indicating a potential problem with the vehicle. For example, if the engine control module 32 determines that the corrected oxygen percentage and the predicted oxygen percentage differ from each other by more than, for example, 15%, as indicated at 62, then the engine control module 32 may generate a signal, generally indicated by box 64, indicating that one or more systems of the vehicle should be checked for proper operation and functionality.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of controlling an internal combustion engine of a vehicle, the method comprising:

sensing an oxygen percentage of a flow of exhaust gas from the internal combustion engine with an oxygen sensor;

adjusting the sensed oxygen percentage of the exhaust gas based on a concentration of hydrocarbons in the flow of exhaust gas to define a corrected oxygen percentage, with an engine control module; and controlling hydrocarbon injection into the internal combustion engine, with the engine control module, based on the corrected oxygen percentage, when the corrected oxygen percentage is less than a pre-defined minimum value.

2. The method set forth in claim 1 wherein controlling hydrocarbon injection into the internal combustion engine based on the corrected oxygen percentage includes controlling at least one of a hydrocarbon injection rate for in-cylinder combustion, and a hydrocarbon injection rate for a post combustion exhaust gas treatment process.

3. The method set forth in claim 1 wherein controlling hydrocarbon injection into the internal combustion engine based on the corrected oxygen percentage is further defined as limiting hydrocarbon injection into the internal combustion engine to a hydrocarbon concentration capable of being combusted with a quantity of oxygen in the flow of exhaust gas indicated by the corrected oxygen percentage.

4. The method set forth in claim 1 wherein the pre-defined minimum value of the corrected oxygen percentage is equal to 1.0%.

5. The method set forth in claim 1 wherein sensing the oxygen percentage of the flow of exhaust gas is further defined as sensing the oxygen percentage in the flow of exhaust gas in an exhaust gas treatment system, upstream of any catalytic treatment devices of the exhaust gas treatment system.

6. The method set forth in claim 1 further comprising determining the concentration of hydrocarbons in the flow of exhaust gas, with the engine control module.

7. The method set forth in claim 6 wherein determining the concentration of hydrocarbons in the flow of exhaust gas includes calculating the concentration of hydrocarbons from an estimated quantity of hydrocarbons injected into the internal combustion engine.

8. The method set forth in claim 7 wherein adjusting the sensed oxygen percentage includes correlating the concentration of hydrocarbons in the flow of exhaust gas to an oxygen correction factor.

9. The method set forth in claim 8 wherein adjusting the sensed oxygen percentage includes applying the oxygen correction factor to the sensed oxygen percentage to define the corrected oxygen percentage.

10. The method set forth in claim 1 further comprising comparing the corrected oxygen percentage to a predicted oxygen percentage, with the engine control module.

11. The method set forth in claim 10 further comprising calculating the predicted oxygen percentage with the engine control module, from a model based on a sensed mass airflow value of the internal combustion engine, and a value of hydrocarbons injected into the internal combustion engine.

12. The method set forth in claim 11 further comprising signaling a message when the corrected oxygen percentage and the predicted oxygen percentage differ from each other by more than 15%.

13. A method of controlling a concentration of hydrocarbons in a flow of exhaust gas from an internal combustion engine of a vehicle, the method comprising:

sensing an oxygen percentage of the flow of exhaust gas from the internal combustion engine, with an oxygen sensor disposed downstream of an exhaust outlet of the internal combustion engine and upstream of any catalytic devices of an exhaust gas treatment system;

determining a concentration of hydrocarbons in the flow of exhaust gas, with an engine control module;

adjusting the sensed oxygen percentage of the exhaust gas based on the determined concentration of hydrocarbons in the flow of exhaust gas to define a corrected oxygen percentage, with the engine control module; and controlling at least one of a hydrocarbon injection rate for in-cylinder combustion of the internal combustion engine, and a hydrocarbon injection rate for a post combustion exhaust gas treatment process, with the engine control module, based on the corrected oxygen percentage, when the corrected oxygen percentage is less than a pre-defined minimum value.

14. The method set forth in claim 13 wherein controlling at least one of the hydrocarbon injection rate for in-cylinder combustion of the internal combustion engine, and the hydrocarbon injection rate for the post combustion exhaust gas treatment process based on the corrected oxygen percentage is further defined as limiting hydrocarbon injection into the internal combustion engine to a hydrocarbon concentration capable of being combusted with a quantity of oxygen in the flow of exhaust gas indicated by the corrected oxygen percentage.

15. The method set forth in claim 13 wherein the pre-defined minimum value of the corrected oxygen percentage is equal to 1.0%.

16. The method set forth in claim 13 wherein adjusting the sensed oxygen percentage includes correlating the determined concentration of hydrocarbons in the flow of exhaust gas to an oxygen correction factor.

17. The method set forth in claim 16 wherein adjusting the sensed oxygen percentage includes applying the oxygen correction factor to the sensed oxygen percentage, with the engine control module, to define the corrected oxygen percentage.

18. The method set forth in claim 13 further comprising:

comparing the corrected oxygen percentage to a predicted oxygen percentage, with the engine control module; and signaling a message, with the engine control module, when the corrected oxygen percentage and the predicted oxygen percentage differ from each other by more than 15%.

* * * * *